United States Patent [19]

Callerio

[11] Patent Number: 5,403,065
[45] Date of Patent: Apr. 4, 1995

[54] BIOCONDITIONING DEVICE FOR OBJECTS WITH SURFACES SUSCEPTIBLE OF MAKING CONTACT WITH BODY PARTS

[75] Inventor: Antonio Callerio, Milan, Italy

[73] Assignee: F.I.M.A.C. Fabbrica Italiana Macchine Aria Compressa SpA, Senago, Italy

[21] Appl. No.: 286,899

[22] Filed: Aug. 8, 1994

Related U.S. Application Data

[63] Continuation-in-part of Ser. No. 717,310, Jun. 17, 1991, abandoned.

[30] Foreign Application Priority Data

Jun. 19, 1990 [IT] Italy ................................ 20691 A/90

[51] Int. Cl.⁶ ................................................. A47C 7/74
[52] U.S. Cl. ........................... 297/180.11; 297/180.14; 297/452.43
[58] Field of Search .................... 297/452.42, 452.43, 297/452.44, 180.1, 180.11, 180.13, 180.14, 219.1, 228.12, 229, 217

[56] References Cited

U.S. PATENT DOCUMENTS

| | | |
|---|---|---|
| 2,782,834 | 2/1957 | Vigo ...................................... 297/180 |
| 3,242,979 | 3/1966 | Shlosinger ............................. 165/46 |
| 3,681,797 | 8/1972 | Messner ........................... 297/180 X |
| 3,778,851 | 12/1973 | Howorth ....................... 297/DIG. 3 |
| 4,946,220 | 8/1990 | Wyon . |

FOREIGN PATENT DOCUMENTS

| | | |
|---|---|---|
| 462517 | 12/1991 | European Pat. Off. . |
| 1558656 | 4/1970 | France . |
| 2641956 | 7/1990 | France ................................. 297/180 |
| 3320771 | 12/1984 | Germany . |

Primary Examiner—Kenneth J. Dorner
Assistant Examiner—Milton Nelson, Jr.
Attorney, Agent, or Firm—Guido Modiano; Albert Josif

[57] ABSTRACT

Bioconditioning device for objects, such as seats, couches, particular items of clothing and the like, with surfaces susceptible of making contact with body parts. The device includes at least one surface layer made of permeable material, susceptible of making contact with a body part, and at least one internal layer in which at least one channel is defined; the inside of the channel is connected to the surface layer and can be connected to a suction device. The suction device draws a flow of air from outside through the surface layer to facilitate evaporation and removal of any sweat excreted by the body part which is in contact with the surface layer.

21 Claims, 6 Drawing Sheets

BIOCONDITIONING DEVICE FOR OBJECTS WITH SURFACES SUSCEPTIBLE OF MAKING CONTACT WITH BODY PARTS

This application is a continuation-in-part of application Ser. No. 07/717,310, filed Jun. 17, 1991, now abandoned.

BACKGROUND OF THE INVENTION

The present invention relates to a bioconditioning device for objects, such as seats, couches, particular items of clothing and the like, with surfaces susceptible of making contact with body parts.

As is known, the human body has a thermal autoregulation system. In particular, sweating develops in the presence of a high ambient temperature, and by means of said sweating the body conveys to the surface of the skin an aqueous solution which, by evaporating, removes vaporization heat from said surface, thus also cooling the parts underlying the skin and the body itself.

The activity of this phenomenon is proportional to the completeness of the conversion of the water contained in sweat into vapor as said sweat reaches the skin surface, and an even moderate ventilation of said skin is the best way to achieve this conversion, especially when the ambient temperature is close to, or even exceeds, the surface temperature of the human body.

Indeed, one often resorts to the use of fans or ventilators in order to achieve some comfort in high-temperature environments.

Due to clothing and seated positions, in which extensive regions of the body are in contact with surfaces which are scarcely or not at all permeable, and in the presence of stagnant air, sweat does not evaporate, but the body continues to excrete it, drenching clothing and seats with no benefit.

In order to solve this problem, in closed and/or small environments one resorts to forced ventilation, exposing the uncovered parts of the body, usually the head, the neck and the upper part of the chest, to a strong air current which however, by cooling small body surfaces excessively and too quickly, may have harmful consequences on one's health.

In other cases one resorts to conditioning, modifying the temperature and humidity present in a closed environment so as to create more comfortable conditions.

However, a conditioning system has considerable purchase and operating costs. The environmental conditions preset by adjusting the conditioner may furthermore be not satisfactory for all the people who occupy the conditioned environment, due to different individual characteristics.

Another disadvantage which can be observed in the use of environment conditioning systems is the feeling of discomfort which is unavoidably perceived in passing from a conditioned environment to an unconditioned one.

SUMMARY OF THE INVENTION

The aim of the present invention is to solve the above described problems by providing a device which allows the human body to freely perform its thermal regulation function by facilitating the evaporation of sweat in extensive regions of the body where there are large muscular masses which are intensely vascularized and allow the transfer of the cooling action to the other parts of the body.

Within the scope of this aim, an object of the invention is to provide a device which can be applied to, or integrated in, objects such as seats, couches, protective suits, mattresses or others, in those regions susceptible of making contact with body parts, or for those objects which, in their conventional use, may cause discomfort to the user since they prevent the correct evaporation of sweat.

Another object of the invention is to provide a device which can relieve the discomfort of heat without harming one's health.

Still another object of the invention is to provide a device which can be manufactured with modest production costs.

This aim, these objects and others which will become apparent hereinafter are achieved by a bioconditioning device for objects, such as seats, couches, particular items of clothing and the like, with surfaces susceptible of making contact with body parts, characterized in that it comprises at least one surface layer made of permeable material, susceptible of making contact with a body part, and at least one internal layer in which at least one channel is defined, the inside of said channel being connected to said surface layer and being connectable to a suction device to draw a flow of air from the outside through said surface layer to facilitate evaporation and removal of any sweat excreted by said body part in contact with said surface layer.

BRIEF DESCRIPTION OF THE DRAWINGS

Further characteristics and advantages of the invention will become apparent from the description of some preferred but not exclusive embodiments of the device according to the invention, illustrated only by way of non-limitative example in the accompanying drawings, wherein:

FIG. 4 is a partially sectional perspective view of an embodiment of the internal layer of the device according to the invention in its embodiment as seat cover or the like;

FIG. 5 is a transverse sectional view of the device according to the invention in its embodiment as seat cover or the like;

FIG. 7 is a partially sectional perspective view of the device according to the invention in its embodiment as rear seat cover for motor vehicles, for couches or the like;

DESCRIPTION OF THE PREFERRED EMBODIMENTS

In the various illustrated embodiments, the bioconditioning device according to the invention comprises at least one surface layer made of permeable material, preferably a porous fabric, susceptible of making contact with body parts, and at least one internal layer in which channels are defined; said channels are connected to the surface layer and can be connected to a suction device so as to generate a flow of air from the outside through the surface layer.

Figure 1:
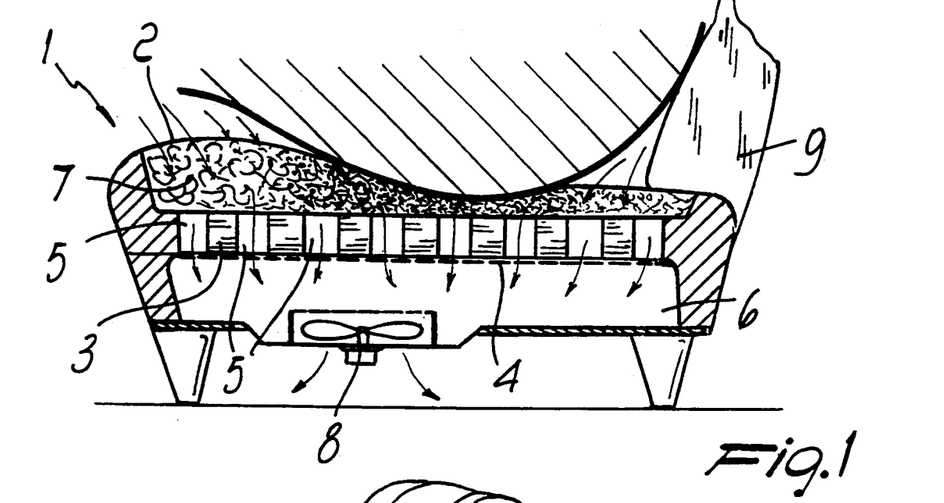
FIG. 1 is a view of the device according to the invention, integrated in a seat or couch which is shown in partial cross section.
Figures 2, 3:
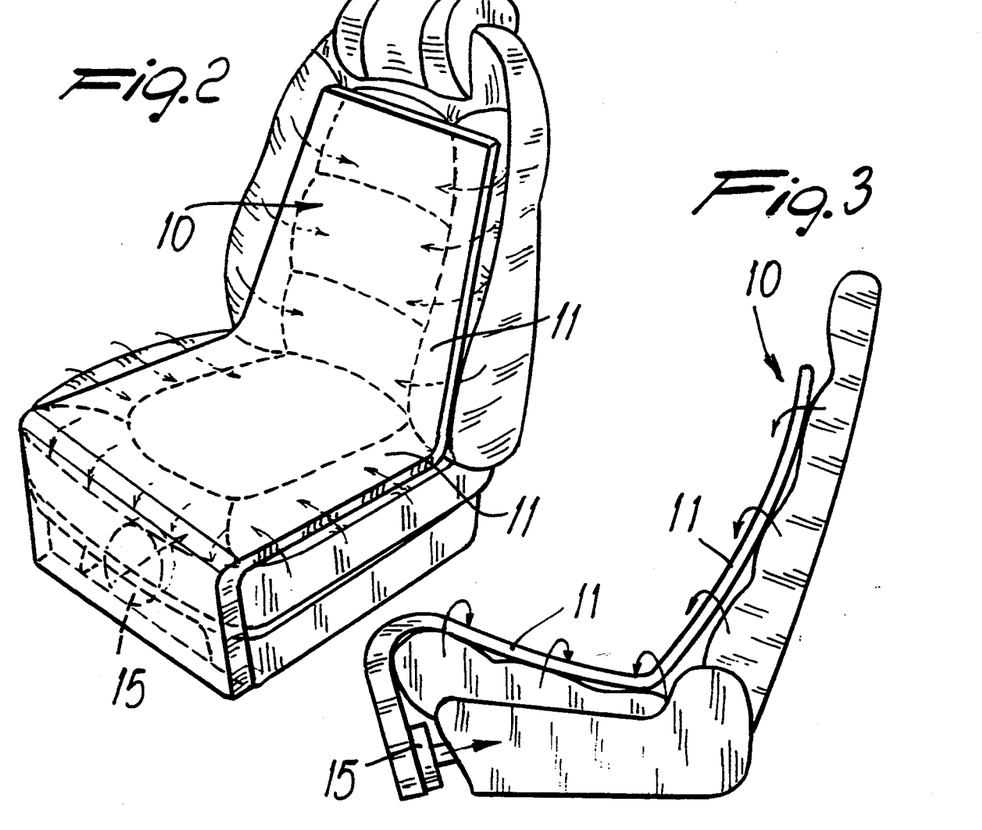
FIG. 2 is a perspective view of the device according to the invention in its embodiment as seat cover.
FIG. 3 is a side view of the device and of the seat illustrated in FIG. 2.

More particularly, FIG. 1 illustrates a seat or couch 1 in which the bioconditioning device according to the invention is integrated.

The portion of the seat or couch which is intended for sitting has a surface layer 2 made of porous fabric. An internal layer 3 is accommodated in the sitting portion and rests on a supporting structure 4, such as for example a supporting spring mesh or slats of a known type, and has a plurality of channels 5 which are connected above to the surface layer 2 and below to a chamber 6.

An elastic porous layer 7 is interposed between the surface layer 2 and the internal layer 3.

A suction device 8 of a known type, which can be powered electrically, is arranged inside the chamber 6; its suction duct is connected to said chamber 6 and its discharge duct leads outside said chamber, for example under the seat.

Even if it is not of the spring-mesh type, the supporting structure 4 is naturally provided with passages to ensure the connection of the channels 5 to the underlying chamber 6, and the internal layer 3 can be either of the rigid type or be elastically deformable, but with a limited deformability so as not to cause the occlusion of the channels 5 when the seat is used.

If required, the back 9 may also naturally be executed similarly to the above described sitting portion, possibly providing a single suction device which serves both the sitting portion and the back.

Figure 6:
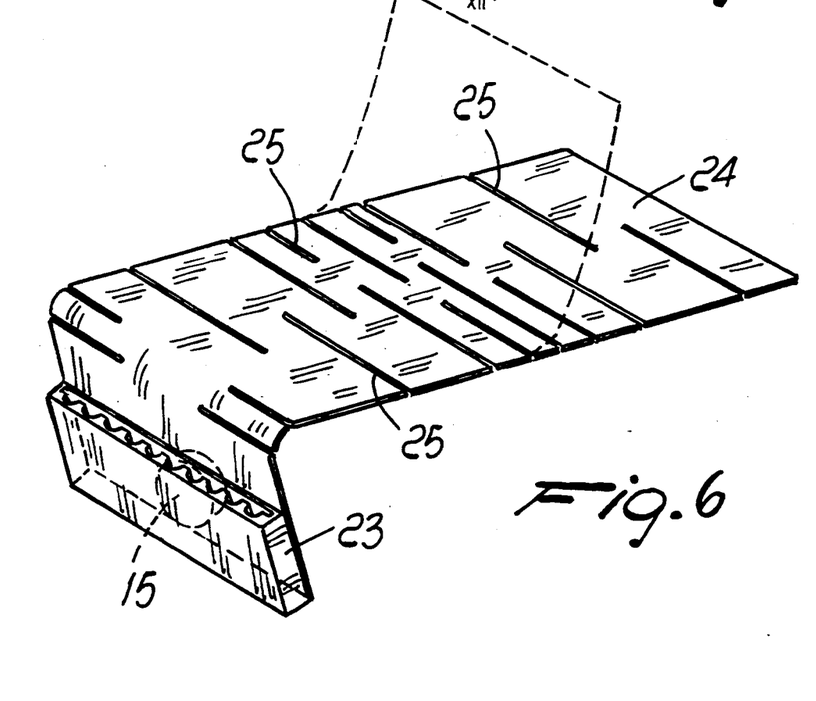
FIG. 6 is a perspective view of an element of the seat cover.
Figure 7:
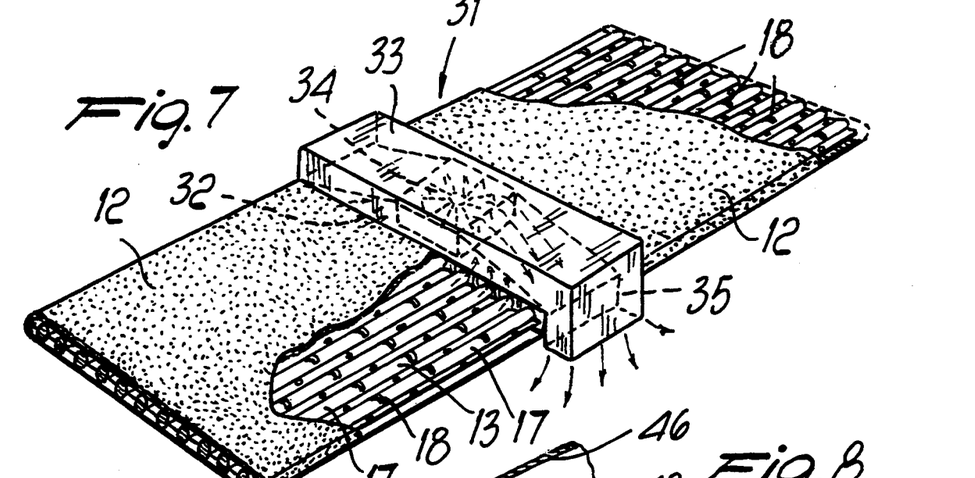

In FIGS. 2 to 7 and 11 to 12 the bioconditioning device according to the invention is illustrated in its embodiment as seat cover, and more in particular, as seat cover 10 for chairs or front seats of motor vehicles in FIGS. 2 to 6 and as seat cover 31 for rear seats of motor vehicles or couches in FIG. 7.

The seat cover illustrated in FIGS. 2 to 6 has: a surface layer 11, made for example of porous fabric so as to be permeable to air; an underlying intermediate layer 12 made of elastic porous material; and an internal layer 13 in which a plurality of channels 14, connected to the surface layer 11 and 16 a suction device 15, is defined.

Figures 4, 5:
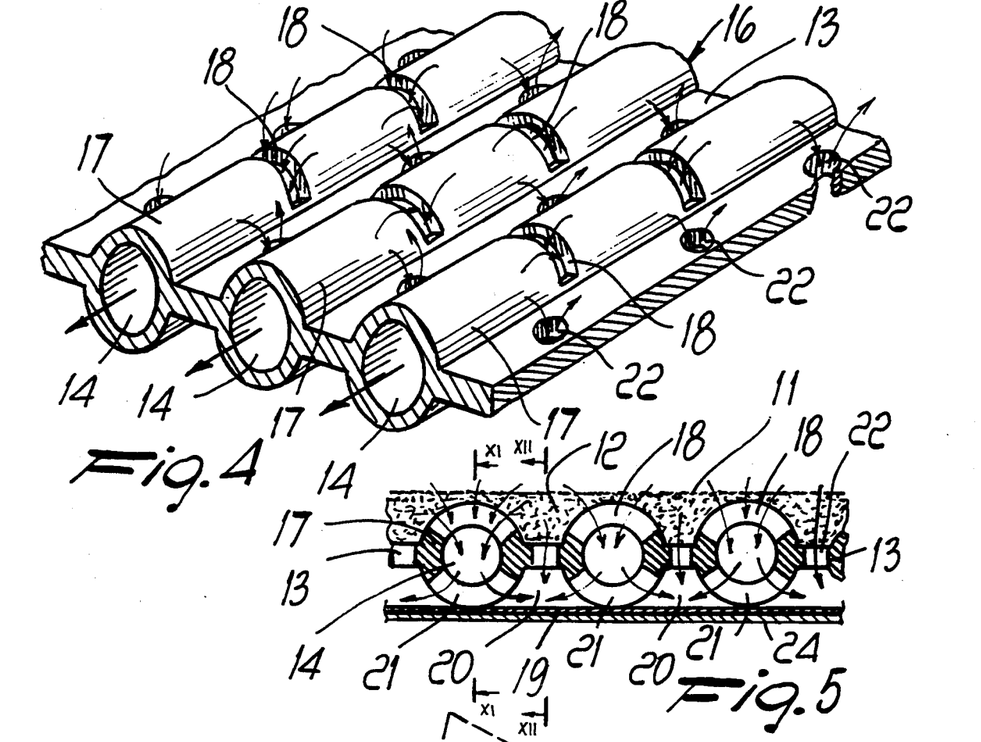

The internal layer 13 is conveniently constituted by a body 16 with a substantially planar extension, which is formed by a plurality of mutually connected parallel tubular bodies 17 within which the channels 14 are defined.

The body 16 can be produced by extruding flexible elastic synthetic material having sufficient resistance to deformation in order to prevent the occlusion of the channels 14 during use.

The channels 14 are connected to the surface layer 11 by means of a plurality of passages 18 which are defined in the tubular bodies 17 on the side of the body 16 which is directed toward the surface layer 11.

An impermeable layer 19 can be applied on the side of the body 16 which is directed opposite to the surface layer 11. In this case, the compartments 20 which are defined between said layer 19 and the tubular bodies 17 may also be connected to the suction device 15.

In this case it is possible to provide passages 21 in the tubular bodies 17 also on the face of the body 16 which is opposite to the surface layer 11, in order to connect the surface layer 11 with said compartments 20 as well. It is furthermore possible to provide passages 22 also in the portions which mutually join the tubular bodies 17, so as to obtain a greater circulation of air between the surface layer 11 and the channels 14 as well as the compartments 20, as illustrated in particular in FIG. 5.

A longitudinal end of the channels 14 of the tubular bodies 17 and of the compartments 20, if provided, is closed, whereas the opposite end of such channels 14 and compartments 20, preferably the end which is intended to be arranged downward, merges (FIGS. 11 and 12) into a chamber or manifold 23 in which the suction device 15 is accommodated so that its outlet leads outward.

A supporting plate-like body 24, made of flexible material to adapt to the configuration of the seat to be covered, is applied on the side of the seat cover at the impereable layer 19 which is opposite to the surface layer 11.

In order to increase the deformability of the supporting body 24 it is possible to provide longitudinal or transverse cuts 25, as illustrated in particular in FIG. 6.

The body 24 can conveniently also support the manifold 23 with the suction device 15 proximate to a longitudinal end thereof.

FIG. 6 shows the manifold 23 with the suction device 15 supported on the supporting body 24.

Figure 11:
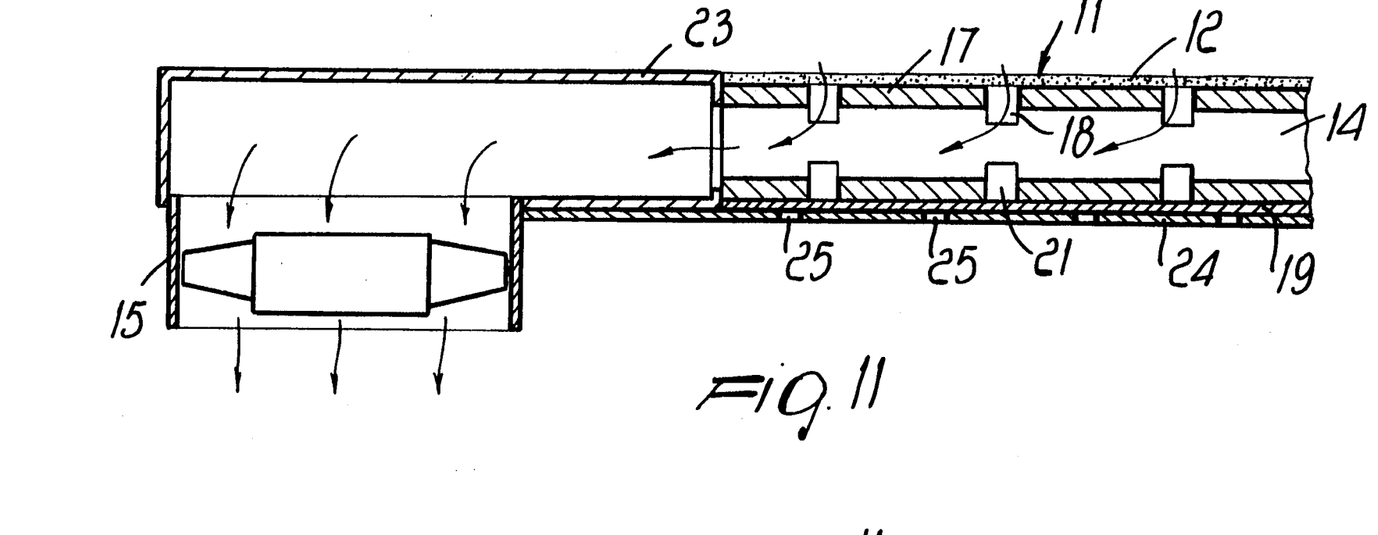
FIGS. 11 and 12 are longitudinal sectional views of the device according to the invention taken along the lines XI—XI and XII—XII respectively of FIG. 5.
Figure 12:
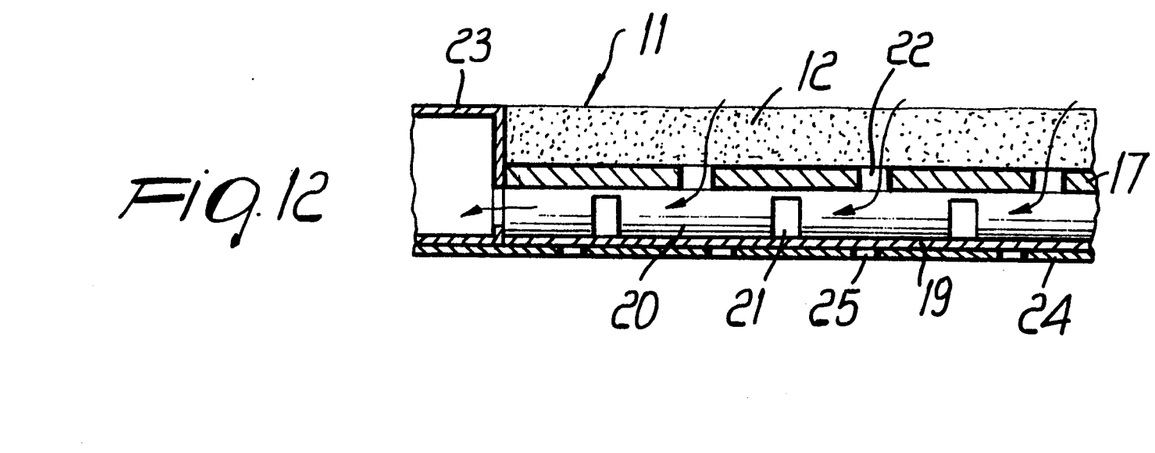

The entire connection between the supporting body 24, manifold 23, impermeable layer 19, tubular bodies 17, and porous layer 12 is shown Schematically in FIGS. 11 and 12, and in particular FIG. 11 shows the previously described merging of the channels 14 into the manifold 23, while FIG. 12 shows the previously described merging of the compartments 20 into the manifold 23. As seen in these FIGS. 11 and 12, the merging of the channels 14 and compartments 20 into the manifold 20 is provided by an adjacent positioning of the end of the tubular bodies 17 to a side of the manifold 23, which manifold is provided with appropriate openings corresponding to the openings of the channels 14 and the compartments 20, thereby to allow air flow through the porous layer 12 and through the tubular bodies 17 and into the manifold 23. This particular connection at the interface between the tubular bodies and manifold is similar to the structure which will be described hereinafter for the merging of the compartments 20 and channels 14 into the manifold 32 of the embodiment of FIG. 7.

FIG. 7 illustrates a seat cover 31 which can be used for back seats of motor vehicles or for couches.

Said seat cover can be manufactured substantially with the same elements already described with reference to the seat cover illustrated in FIGS. 2 to 6, with the difference that the channel 14 and any compartments 20 are closed at the two longitudinal ends, whereas an intermediate portion thereof merges into a chamber or manifold 32 defined in a central arm-rest 33. Said arm-rest 33 also accommodates a suction device 34 and the related discharge duct 35 which leads outward. In practice, the inside of the arm-rest 33 is divided into two chambers, one which acts as manifold and one which acts as discharge duct, and the suction device 34 is arranged between said two chambers.

Advantageously, the intermediate layer indicated in the various embodiments described so far with the reference numerals 7 and 12 may have differentiated densities in the various regions, so as to facilitate suction in preset regions with respect to regions for which said suction is less required.

Figures 8, 9, 10:
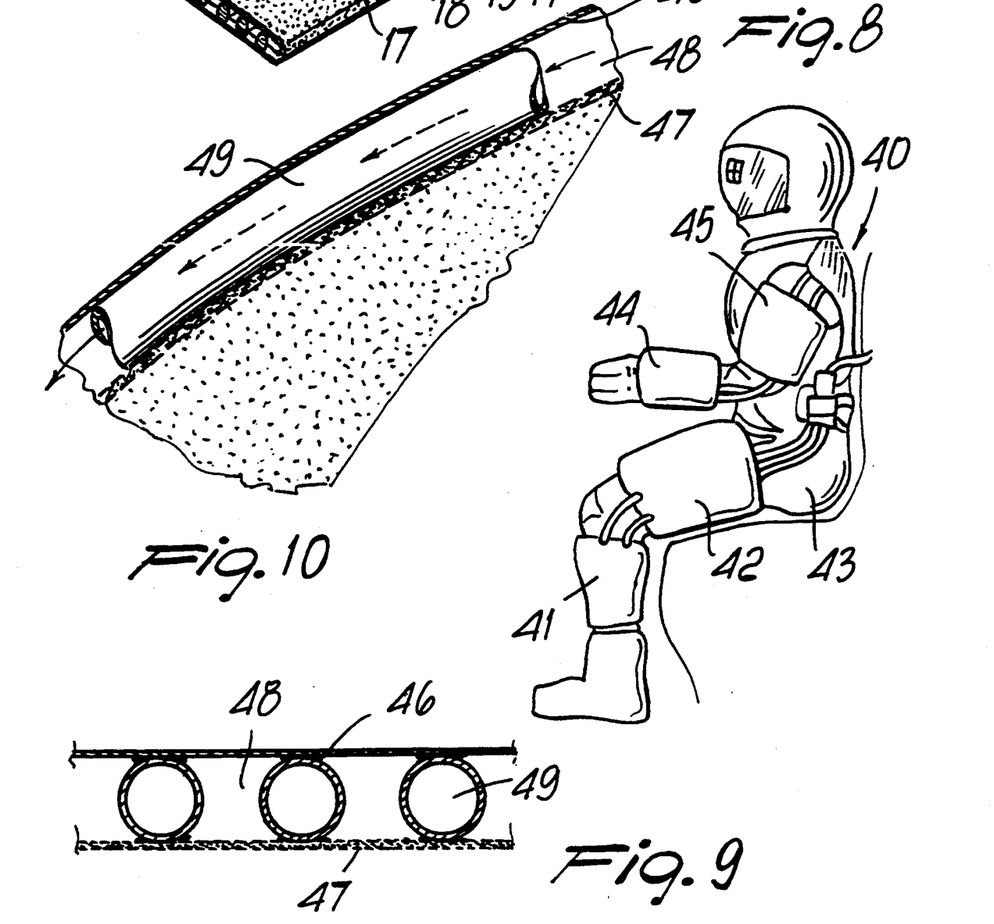
FIG. 8 is a view of a protective suit provided, in preset regions, with the device according to the invention.
FIG. 9 is a sectional view of a portion of the suit in the regions affected by the device according to the invention.
FIG. 10 is a sectional perspective view of a portion of the suit in a region affected by the device according to invention.

The concept of the invention can also be applied to protective suits for aerospace use or for other kinds of use, as illustrated in FIGS. 8 to 10.

In this case it is possible to provide portions of the suit 40, indicated by the reference numerals 41 to 45 in FIG. 8, which are in contact with the main muscle bundles, which are integrated with a bioconditioning device according to the invention.

In this embodiment, the outer layer 46 of said parts is impermeable, whereas the internal layer 47, susceptible of making contact with body parts of the user, is made of permeable material.

An interspace 48 is defined between the outer layer 46 and the internal layer 47 and can be connected to a suction device or to an air conditioning system; after conditioning, the air is reintroduced in the suit.

In the case of aerospace suits, the interspace 48 accommodates, in a known manner, pressurization tubes 49 the inside whereof is sealingly separated from the inside of the interspace 48.

Figures 13, 14:
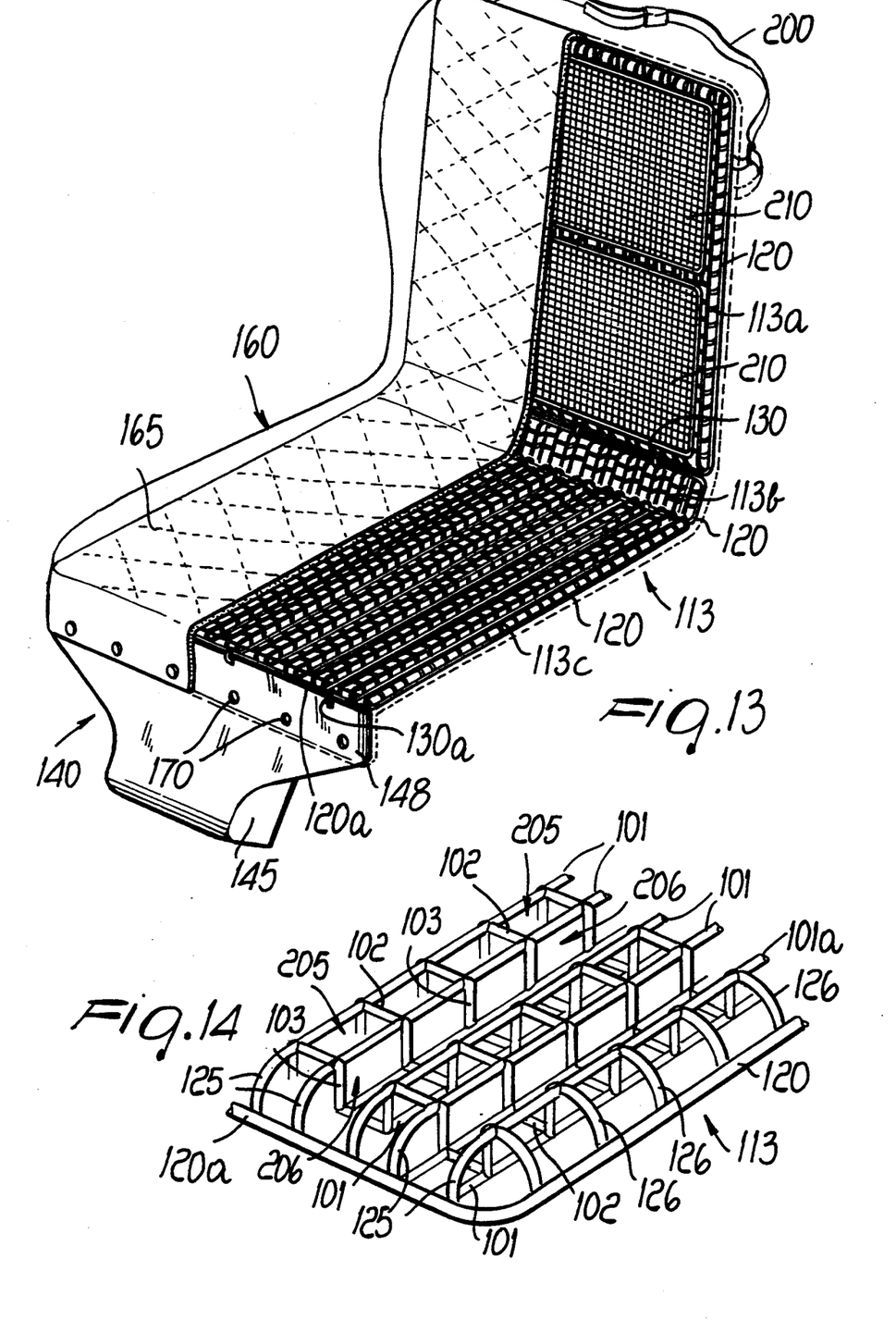
FIG. 13 is a partially cutaway perspective view of a further embodiment according to the invention.
FIG. 14 is a perspective view of a corner portion of a frame member of the device of FIG. 13.

FIGS. 13-17 show a further embodiment of the invention, in which there is provided an internal layer in the shape of a frame member 113 formed of interconnected rod-like pieces, preferably made of rigid plastic material. The rod-like pieces comprise longitudinal pieces 101 generally arranged in pairs in both an upper plane and a lower plane of the frame member. Each pair of longitudinal pieces are interconnected by a plurality of short transverse pieces 102, thereby to form upper longitudinal ladder elements and lower longitudinal ladder elements (FIG. 14).

Each edge of an upper longitudinal ladder element is connected to an appropriate edge of a lower longitudinal ladder element, by means of a plurality of short vertical pieces 103, extending substantially vertically, and preferably arranged in correspondence with the short transverse pieces 102.

Figures 15, 16, 17:
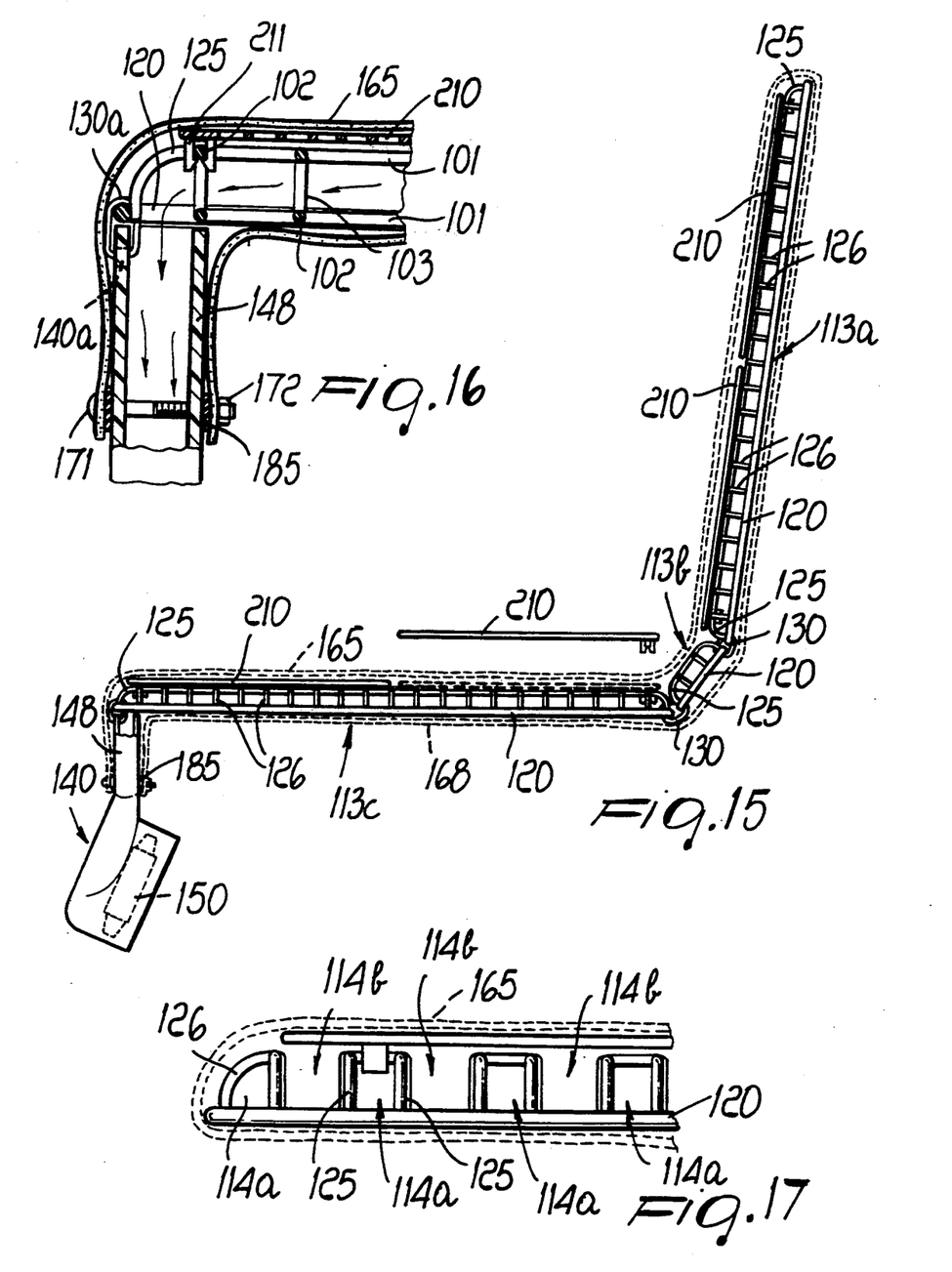
FIG. 15 is a sectional lateral elevation view of the device of FIG. 13.
FIG. 16 is a sectional lateral elevation view of a portion of the device of FIGS. 13 and 15, showing the connection between the frame member and a manifold.
FIG. 17 is a front elevation view of a portion of the frame member of the device of FIGS. 13 to 16, showing the cover element in phantom lines.

In this manner, a plurality of downwardly facing open channels 114a and a plurality of upwardly facing open channels 114b are formed longitudinally in the frame member (FIG. 17).

The frame member is advantageously formed by three subframe members 113a, 113b, 113c (FIGS. 13 and 15), each of which comprises a peripheral rod-like piece 120 arranged in the lower plane. Each longitudinal piece of the upper longitudinal ladder elements has end bent portions 125 which extend downwardly to connect to the peripheral rod-like piece. A plurality of curved pieces 126 interconnect lone edge upper longitudinal pieces 101a to the lower peripheral rod-like piece.

Means are provided for mutually pivotally connecting respective edges of the peripheral rod-like pieces of the sub-frame members. Clip elements 130, in the form of small metal rods bent in the shape of a closed circle, are provided for this purpose, and thereby the frame member is bendable along substantially transverse axes thereby to be able to advantageously fit to the shape of a seat.

At an end of the frame member, a manifold 140 is pivotally connected to an edge portion 120a of a peripheral rod-like piece of one of the sub-frames. The pivotal connection is provided by further clip elements 130a, which extend through holes 140a in the manifold.

A suction device 150 is accommodated in a distal constricted end 145 of the manifold. The suction device may be advantageously driven by plugging an electrical connector into a conventional lighter device provided in automobiles and the like. The suction device is adapted for drawing air into an end 148 of the manifold and expelling the drawn air out of the manifold at the distal constricted end 145 thereof.

There is furthermore provided a single piece cover element 160 having substantially the same shape as the frame member. The cover element comprises an upper side 165 having a surface layer made of porous fabric and a lower side 168 made of impermeable material. The upper side of the cover element furthermore comprises an elastic porous padding layer, made of permeable material and arranged just below the surface layer thereof. The upper and lower sides are mutually connected by stitching at three peripheral edges thereof, and therefore a fourth edge is open, so that the cover element may be easily slipped over the frame member.

The frame member thereby becomes snugly accommodated in the cover element, so that the upper side of the cover element is arranged just above the upper plane of the frame element, and the lower side of the cover element is arranged just below the lower plane of the frame element.

The open edge of the cover element advantageously is arrangeable so as to completely cover the end 148 of the manifold. Means are provided for removably connecting the open end of the cover to the manifold. Such means comprise aligned holes 170 provided in the open end of the cover element and in the end 148 of the manifold, and bolt 171 and nut elements 172. This removable connection advantageously allows one to easily wash the cover element.

A circumferential gasket element 185 is disposed around the end 148 of the manifold, between the end 148 and the inner surface of the open end of the cover element, and at the zone of connection between the cover element and the manifold. Thus the gasket element is also provided with holes which are aligned with the aligned holes of the open end of the cover element and the end 148 of the manifold and through which the bolt elements 171 extend. The gasket element as described provides an excellent sealing between the manifold and the cover element, thereby to form a sealed chamber inside the cover element into which air can substantially flow only through the upper side 165 (with a surface layer made of porous fabric) of the cover element.

Adjustable strap elements 200 are also provided on the lower side of the cover element to permit a secure connection of the device to a seat. Upon securement, the manifold and suction device advantageously become arranged frontally and below the bottom, substantially horizontal, portion of the seat.

Passages 205 are defined between the short transverse pieces 102 of the upper longitudinal ladder elements. Upon activation of the suction device, moisturized air passes through the upper side of the cover element and through the passages and into the downwardly facing open channels. The moisturized air then runs in the downwardly facing open channels into the manifold and is expelled therefrom by the suction device.

Moisturized air also passes through the upper side of the cover element directly into the upwardly facing open channels 114b of the frame member. The moisturized air also runs in the upwardly facing open channels into the manifold and is expelled therefrom by the suction device.

Lateral passages 206 are also defined between the short vertical pieces 103 of the frame member, thereby to allow air to flow also between the upwardly facing open channels and the downwardly facing open channels.

The particular structure of the frame member provides channels which extend longitudinally in the internal layer, towards the manifold, and which offer a very low resistance to the air flow. At the same time, the frame member provides adequate strength for supporting the weight applied thereto by a user.

Further support is provided by net members 210 which may be removably connected to the frame member at the upper plane thereof, by means of elastic snap hooks 211 which engage with the upper longitudinal ladder elements, particularly with the short transverse pieces 102 thereof. The net members have openings which are smaller than the passages defined in the upper ladder members. The net members, made of semi-rigid plastic material, partially obscure the passages in the upper ladder members and the large upwardly facing openings in the upwardly facing open channels, thereby to provide improved support and optimal weight distribution on the frame member, while still permitting a good air flow through the upper side of the cover element and into the plurality of channels of the frame member.

With the described structure, an optimal air flow is created with a pressure drop of approximately 5 to 6 millimeters of water, while using a suction device with rated power of 6 watts. This large pressure drop, achieved by a low power suction device, is also provided over a relatively large surface area of the upper side of the cover element.

The operation of the bioconditioning device according to the invention, in its various embodiments, is as follows.

The actuation of the suction device causes a low-speed suction of the hot and humid boundary layer which stagnates proximate to the regions of contact between the body and the surface layer of the bioconditioning device. The surface layer, made of porous fabric, allows the ventilation of the neighboring regions and of those which are in contact with the body, and transmits the humidity (sweat) due to capillarity of the fibers from the regions of contact to the neighboring regions, which are affected by the flow of ventilation air.

In this manner an inflow of fresh air, not saturated with humidity and capable of evaporating-drying the sweat, allowing the autoregulation effect of the body, is produced.

In practice it has been observed that the device according to the invention fully achieves the intended aim, since by facilitating the evaporation of sweat in extensive regions of the human body in which there are large and intensely vascularized muscular masses it achieves a cooling action simply by placing said body in the best conditions for performing effective self-cooling.

Furthermore, by not inhibiting sweating, indeed by facilitating it, it aids the elimination of the substances which are expelled by the organism through sweating.

A further advantage is that it allows an optimum diversified cooling effect for a plurality of people placed in the same environment according to their different physiological characteristics, and that it does not expose the user to sudden temperature differences which could have harmful effects on his health.

Still another advantage is inherent in the low manufacturing and operating costs of the bioconditioning device.

Although the bioconditioning device according to the invention has been described in its application to couches, seats, seat covers and suits, it may also be integrated in other objects for which the problem of removing the sweat of body parts in contact therewith is felt. Thus, for example, it is possible to produce mattress covers, manufactured substantially like the above described seat cover, or mattresses which integrate the bioconditioning device in order to make their use more comfortable in the summer season. Mattress covers or mattresses of this type can furthermore prevent the forming of bedsores in patients in the hospital field.

The bioconditioning device thus conceived is susceptible to numerous modifications and variations, all of which are within the scope of the inventive concept; all the details may furthermore be replaced with technically equivalent elements.

In practice, the materials employed, so long as compatible with the specific use, and the dimensions, may be any according to the requirements and to the state of the art.

I claim:

1. Bioconditioning device for objects, such as seats, couches, particular items of clothing and the like, with surfaces susceptible of making contact with body parts, comprising at least one surface area made of permeable material, susceptible of making contact with a body part, and at least one channel which communicates between said at least one surface area and a chamber which is subjected to a suction means for drawing air from outside and through said at least one surface area, through said at least one channel, through said chamber, and through an outlet means connected to said chamber, thereby facilitating evaporation and removal of any sweat excreted by the body part in contact with said at least one surface area, the bioconditioning device further comprising an internal layer defining a longitudinal extension and comprising an elastically flexible body through which a plurality of parallel tubular bodies extend, said at least one channel being constituted by a plurality of channels defined in said tubular bodies, said channels communicating with said surface area by means of first passages which are defined in said tubular bodies on a side thereof facing said surface area, wherein said channels are closed at one end thereof, said chamber comprising a manifold arranged in communication with said channels at another end thereof, said suction means being connected to said manifold.

2. Bioconditioning device according to claim 1, wherein said at least one surface area is made of porous fabric.

3. Bioconditioning device according to claim 1, further comprising said internal layer arranged between said surface area and said chamber, said at least one channel being constituted by a plurality of channels defined in said internal layer, said internal layer being adapted to rest on a supporting structure of a seat or couch and thereby said chamber being defined below said supporting structure.

4. Bioconditioning device according to claim 1, further comprising an elastic porous layer interposed between said surface area and said internal layer, said elastic porous layer having a differentiated density along its extension.

5. Bioconditioning device according to claim 1, further comprising a supporting plate-like structure arranged along said longitudinal extension opposite to said surface area, said plate-like structure being made of flexible material and being provided with cuts to increase deformability.

6. Bioconditioning device according to claim 1, further comprising an impermeable layer attached to said tubular bodies on a side opposite to said surface area thereof, longitudinal compartments being defined between said impermeable layer and said tubular bodies which are also in communication with said manifold, second passages being furthermore provided in said tubular bodies on a side thereof facing said compartments to thereby allow communication between said passages and said compartments.

7. Bioconditioning device according to claim 1, further comprising an intermediate layer of elastic porous material interposed between said surface area and said tubular bodies, third passages being furthermore provided in portions which mutually join said tubular bodies for direct communication from said surface area to said compartments.

8. Bioconditioning device for objects, such as seats, couches, particular items of clothing and the like, with surfaces susceptible of making contact with body parts, comprising:
  a porous surface layer made of permeable material which is susceptible of making contact with a body part;
  an internal layer which comprises a plurality of channel elements;
  an intermediate elastic porous support layer made of permeable material which is arranged between said porous surface layer and said internal layer;
  a chamber which is in communication with said plurality of channel elements;
  a plurality of passages upwardly provided in said plurality of channel elements for communication between said intermediate layer and said channel elements; and
  a suction means connected with said chamber for drawing air from outside and through said surface layer, through said intermediate layer, through said plurality of passages, through said plurality of channel elements, through said chamber, and through an outlet means connected to said chamber,
  thereby facilitating evaporation and removal of any sweat excreted by the body part in contact with said surface layer.

9. Bioconditioning device according to claim 8, wherein said internal layer rests on a supporting structure of a seat, said chamber being defined below said supporting structure.

10. Bioconditioning device according to claim 8, wherein said plurality of channel elements are closed at one end thereof, said chamber comprising a manifold arranged in communication with said plurality of channel elements at another end thereof, said suction means being connected to said manifold.

11. Bioconditioning device according to claim 8, wherein said plurality of channel elements are closed at both opposite ends thereof, said chamber comprising a manifold arranged in communication with said plurality of channel elements at a middle portion thereof, said suction means being connected between said manifold and said outlet means which comprise a discharge duct.

12. Bioconditioning device according to claim 11, further comprising a central arm rest in which said manifold and said discharge-duct are arranged.

13. Bioconditioning device according to claim 8, further comprising:
  an impermeable layer arranged below said internal layer;
  a plurality of compartments defined between said internal layer and said impermeable layer, said plurality of compartments also being in communication with said chamber; and
  a second plurality of passages downwardly provided in said plurality of channel elements for communication between said plurality of channel elements and said plurality of compartments.

14. Bioconditioning device according to claim 13, wherein said plurality of channel elements are constituted by tubular bodies which are mutually interconnected by planar portions, said planar portions being provided with a third plurality of passages for communication directly between said intermediate layer and said plurality of compartments.

15. Bioconditioning device according to claim 13, further comprising a supporting plate-like structure arranged under said impermeable layer, said plate-like structure being made of flexible material and being provided with cuts to increase deformability thereof.

16. The bioconditioning device according to claim 8, wherein said internal layer comprises a frame member formed of interconnected rod-like pieces, the rod-like pieces including:
  a plurality of longitudinal pieces arranged in pairs in both an upper plane and a lower plane of the frame member;
  a plurality of short transverse pieces interconnected between each pair of longitudinal pieces thereby to form a plurality of upper longitudinal ladder elements and a plurality of lower longitudinal ladder elements;
  a plurality of short vertical pieces interconnected between offset edge longitudinal pieces of the upper longitudinal ladder elements and the lower longitudinal ladder elements, thereby to arrange the upper longitudinal ladder elements in the upper plane and the lower longitudinal ladder elements in the lower plane, and wherein said plurality of channel elements comprise a plurality of downward facing open channels and a plurality of upwardly facing open channels, in which each upper longitudinal ladder element and respective short vertical pieces connected thereto forms a respective one of said plurality of downward facing open channels and in which each lower longitudinal ladder element and respective short vertical pieces connected thereto forms a respective one of said plurality of upwardly facing open channels.

17. The bioconditioning device according to claim 16, wherein said plurality of passages comprise: large longitudinal openings formed in said plurality of upwardly facing open channels; and small passages formed between the longitudinal pieces and the short transverse pieces of said plurality of upper longitudinal ladder elements of said plurality of downwardly facing open channels.

18. The bioconditioning device according to claim 16, comprising a plurality of said frame members, and means for mutually pivoting respective ends of said frame members about transverse axes thereby said internal layer being foldable about said transverse axes.

19. The bioconditioning device according to claim 16, further comprising a plurality of supporting net members and means for connecting said plurality of supporting net members to said frame member at the upper plane thereof.

20. The bioconditioning device according to claim 16, further comprising lateral passages which are defined between the short vertical pieces of the frame member, thereby to allow air to flow also between the upwardly facing open channels and the downwardly facing open channels.

21. The bioconditioning device according to claim 16, wherein said chamber is connected to one end of said frame member, and wherein the device further comprises a single piece cover element having substantially the same shape as the frame member, said cover element comprising an upper side having a surface layer made of porous fabric and a lower side made of impermeable material, said upper and lower sides being mutually connected by stitching at three peripheral edges thereof, and the cover element comprising a fourth edge which is open, so that the cover element may be easily slipped over and removed from the frame member, the device further comprising means for removably and sealingly connecting the open edge of the cover element to said chamber.

* * * * *